(12) United States Patent
Moudgill et al.

(10) Patent No.: US 11,157,407 B2
(45) Date of Patent: Oct. 26, 2021

(54) IMPLEMENTING ATOMIC PRIMITIVES USING CACHE LINE LOCKING

(71) Applicant: Optimum Semiconductor Technologies, Inc., Tarrytown, NY (US)

(72) Inventors: Mayan Moudgill, Chapaqua, NY (US); A. Joseph Hoane, Yonkers, NY (US)

(73) Assignee: Optimum Semiconductor Technologies Inc., Tarrytown, NY (US)

( * ) Notice: Subject to any disclaimer, the term of this patent is extended or adjusted under 35 U.S.C. 154(b) by 0 days.

(21) Appl. No.: 15/841,974

(22) Filed: Dec. 14, 2017

(65) Prior Publication Data

US 2018/0173625 A1    Jun. 21, 2018

Related U.S. Application Data

(60) Provisional application No. 62/434,525, filed on Dec. 15, 2016.

(51) Int. Cl.
| | | |
|---|---|---|
| *G06F 12/0817* | (2016.01) | |
| *G06F 9/30* | (2018.01) | |
| *G06F 12/084* | (2016.01) | |
| *G06F 12/0895* | (2016.01) | |
| *G06F 9/52* | (2006.01) | |

(Continued)

(52) U.S. Cl.
CPC ........ *G06F 12/0817* (2013.01); *G06F 9/3004* (2013.01); *G06F 9/30047* (2013.01); *G06F 9/30087* (2013.01); *G06F 9/526* (2013.01); *G06F 9/54* (2013.01); *G06F 12/084* (2013.01);

(Continued)

(58) Field of Classification Search
CPC .............. G06F 12/0817; G06F 9/3004; G06F 9/30087; G06F 9/526; G06F 9/54; G06F 12/0811; G06F 12/0895; G06F 12/084; G06F 9/30047; G06F 2212/62; G06F 9/3861
See application file for complete search history.

(56) References Cited

U.S. PATENT DOCUMENTS 5,584,012 A * 12/1996 Kojima ................. G06F 3/0601
                                                    711/122
6,629,214 B1    9/2003 Arimilli et al.
(Continued)

OTHER PUBLICATIONS

Schwartz, David; "LOCK prefix vs MESI protocol?"; Jan. 8, 2016; pp. 1-3 [online]; [retrieved on Sep. 16, 2020]; Retrieved from the Internet: <URL:https://stackoverflow.com/questions/29880015/lock-prefix-vs-mesi-protocol?answertab=active#tab-top>. (Year: 2016).*

(Continued)

*Primary Examiner* — Nanci N Wong
*Assistant Examiner* — Tong B. Vo
(74) *Attorney, Agent, or Firm* — Zhong Law, LLC

(57) ABSTRACT

A processor comprising a cache, the cache comprising a cache line, an execution unit to execute an atomic primitive to responsive to executing a read instruction to retrieve a data item from a memory location, cause to store a copy of the data item in the cache line, execute a lock instruction to lock the cache line to the processor, execute at least one instruction while the cache line is locked to the processor, and execute an unlock instruction to cause the cache controller to release the cache line from the processor.

18 Claims, 3 Drawing Sheets

(51) Int. Cl.
*G06F 9/54* (2006.01)
*G06F 12/0811* (2016.01)

(52) U.S. Cl.
CPC ...... *G06F 12/0811* (2013.01); *G06F 12/0895* (2013.01); *G06F 2212/62* (2013.01)

(56) References Cited

U.S. PATENT DOCUMENTS

| | | | |
|---|---|---|---|
| 6,816,952 B1 * | 11/2004 | Vartti | G06F 9/52 711/163 |
| 7,080,211 B2 | 7/2006 | Hooker | |
| 10,599,485 B2 * | 3/2020 | Levandoski | G06F 9/30043 |
| 2002/0087810 A1 * | 7/2002 | Boatright | G06F 12/0831 711/145 |
| 2004/0117564 A1 * | 6/2004 | Grenholm | G06F 12/0815 711/150 |
| 2005/0044319 A1 | 2/2005 | Olukotun | |
| 2006/0212653 A1 * | 9/2006 | Alexander | G06F 9/3004 711/122 |
| 2007/0050563 A1 | 3/2007 | Alsup | |
| 2007/0150658 A1 * | 6/2007 | Moses | G06F 12/084 711/130 |
| 2010/0281220 A1 * | 11/2010 | Cantin | G06F 12/084 711/130 |
| 2010/0332766 A1 * | 12/2010 | Zeffer | G06F 9/526 711/144 |
| 2013/0054915 A1 * | 2/2013 | Chee | G06F 9/526 711/163 |
| 2016/0004639 A1 * | 1/2016 | Vorbach | G06F 9/526 711/122 |
| 2016/0357791 A1 * | 12/2016 | Levandoski | G06F 9/46 |
| 2017/0286115 A1 * | 10/2017 | Coleman | G06F 9/30047 |

OTHER PUBLICATIONS

PCT, International Search Report and Written Opinion for International Application No. PCT/US17/66670, dated Mar. 8, 2018, 7 pages.
European Application No. EP17879755, Extended European Search Report dated Jul. 7, 2020, 16 pages.

* cited by examiner

300

Responsive to executing a read instruction to retrieve a data item from a memory location, causing to store a copy of the data item in a cache line of a cache 302

Executing a lock instruction to lock the cache line to the processor 304

Executing at least one instruction while the cache line is locked to the processor 306

Executing an unlock instruction to cause the cache controller to release the cache line from the processor 308

FIG. 3

IMPLEMENTING ATOMIC PRIMITIVES USING CACHE LINE LOCKING

RELATED APPLICATIONS

The present application claims priority to U.S. Provisional Application No. 62/434,525 filed on Dec. 15, 2016, the content of which is incorporated by reference herein.

TECHNICAL FIELD

The present disclosure relates to a processor and, more specifically, to implementations of atomic primitives using cache line locking.

BACKGROUND

In computer programming, a primitive is a segment of code that can be used to build more sophisticated program elements or user interface.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a block diagram of a method to execute an atomic primitive according to an embodiment of the present disclosure.

DETAILED DESCRIPTION

Figure 1:
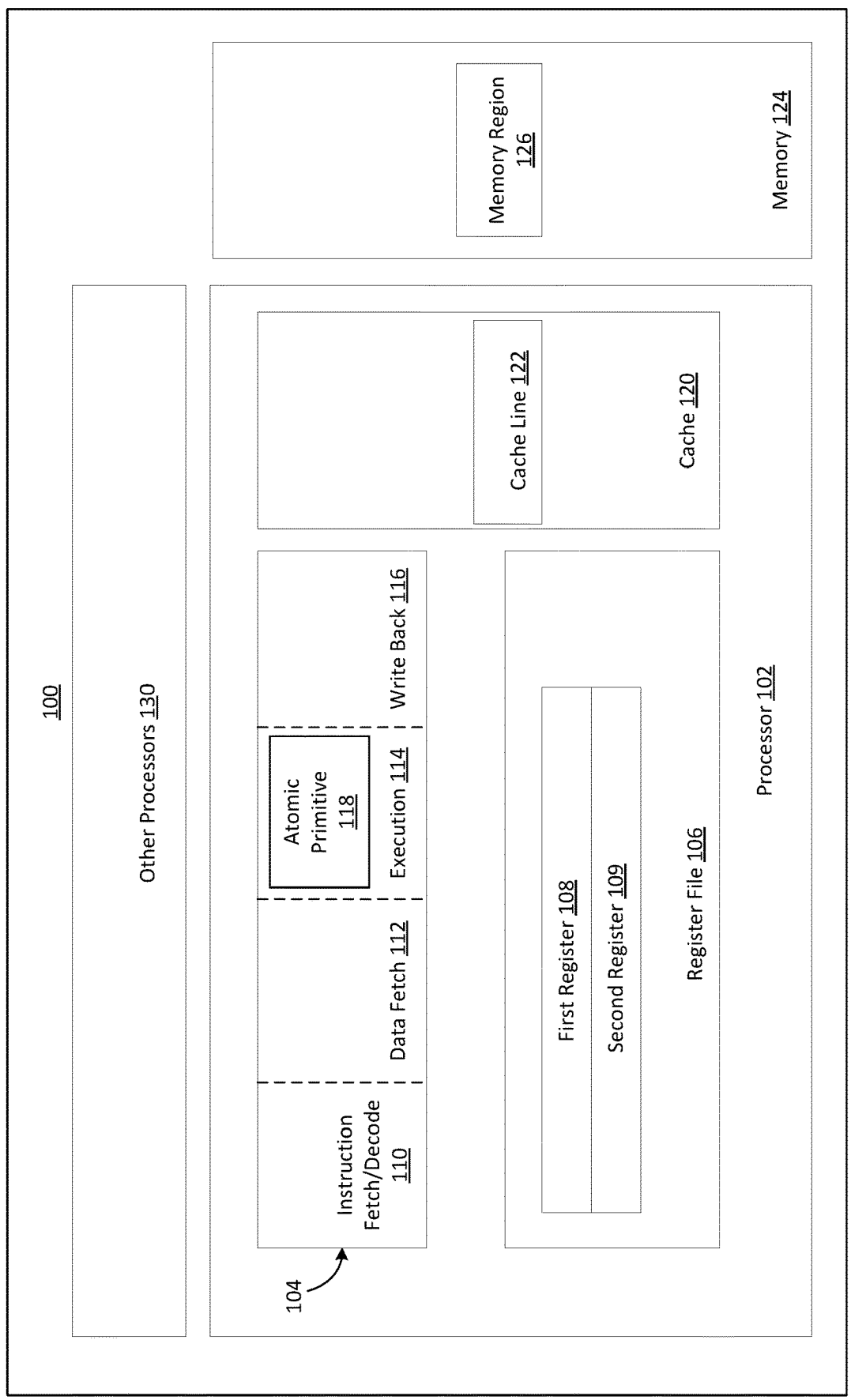
FIG. 1 illustrates a system-on-a-chip (SoC) according to an embodiment of the present disclosure.

A computer system may include one or more processors to execute multiple processes, either in a time shared fashion by one processor, or in parallel by multiple processors in a multi-processor system/multi-threaded processor system. These systems rely on various inter-process communication and coordination mechanisms to read, modify and write memory location(s).

A processor may execute a read-modify-write sequence of instructions directed to a memory location, including a read operation to read the data stored at the memory location, modify the data, and then write the modified data back to the memory location. The execution of the read-modify-write sequence is atomic if, after the processor has performed the read, it is guaranteed that no other processor can access and modify the data stored at that location until the first processor has completed its write operation.

Consider the sequence of instructions, as shown in Table 1, to implement an increment of the value stored at memory location A.

TABLE 1

| increment: | |
|---|---|
| load | $r0,A |
| add | $r0,$r0,1 |
| store | $r0,A |

Assuming that memory location A initially stores a value of 8. After execution of the code sequence as shown in Table 1 is completed, the value stored at memory location A is 9.

In some implementations, a computer system may include multiple processors. For example, two processes may run concurrently by two different processors that are concurrently executing the code sequence of Table 1 on the same memory location A. Ideally, after both processes complete, the value stored at memory location A would have been incremented twice, to 10, assuming that the value stored at memory location A was initially 8 before both processes started. This can occur if the two processors execute the code in the following order as shown in Table 2.

TABLE 2

| # PROCESS 1 | | | # PROCESS 2 | | |
|---|---|---|---|---|---|
| load | $r0,A | # r0 = 8 | | | |
| add | $r0,$r0,1 | | | | |
| store | $r0,A | # A = 9 | | | |
| | | | load | $r0,A | # $r0 = 9 |
| | | | add | $r0,$r0,1 | |
| | | | store | $r0,A | # A = 10 |

But in the absence of atomicity, it is possible that the two increments are executed in this order as shown in Table 3.

TABLE 3

| # PROCESS 1 | | | # PROCESS 2 | | |
|---|---|---|---|---|---|
| load | $r0,A | # r0 = 8 | | | |
| add | $r0,$r0,1 | | | | |
| | | | load | $r0,A | # $r0 = 8 |
| store | $r0,A | # A = 9 | | | |
| | | | add | $r0,$r0,1 | |
| | | | store | $r0,A | # A = 9! |

In the example as shown in Table 3, the value stored in memory region A is only incremented once, which is not the intended outcome.

Thus, certain primitives may need to be implemented as atomic primitives that prevent a second processor from accessing the memory region operated on by a first processor. Examples of useful primitives that can be implemented in hardware or software as atomic primitives may include:

increment/decrement primitives: add/subtract one from a value stored at a memory location;

add primitives: add a value to the value stored at a memory location;

swap primitives: read the old value from a memory location, and write a new value to the memory location;

test-and-set primitives: a variation of swap primitives, where the memory location can store either a first value (e.g., 0) or a second value (e.g., 1); and if a test shows that the memory location stores the second value (e.g., 1), the execution of the test-and-set primitive would write over the memory location; and if the test shows that the memory location stores the first value (e.g., 0);

compare-and-swap primitives: read a value from a memory location into a first register; and if it is equal to a second value stored in a second register, write a third (new) value to the memory location, double compare-and-swap primitives: like compare and swap, except that a pair of values are read from two (possibly contiguous) memory locations; and compare the two values; and write a new pair to the two memory locations if both values are the same.

As an example, the pseudo-code for the compare-and-swap primitive is shown in Table 4.

TABLE 4

```
compare_and_swap:
    load         $r0,A
    jmp_ne       $r0,$r1,L.0
    store $r2,A
L.0:
```

Atomic primitives may be implemented on processors as an instruction set architecture (ISA) instruction or as a sequence of ISA instructions.

Some ISAs provide instructions that directly implement one or more the atomic primitives. One common primitive that is supported is the compare-and-swap primitive. More recent variants of the x86 have the compare and exchange instruction (CMPXCHG) instruction that directly implements the atomic compare-and-exchange primitive.

Other ISAs may provide instructions that can be used as building blocks for a variety of atomic primitives. These atomic primitives can be implemented using sequences of instructions specified by these ISAs. For example, a pair of instructions, load-link and store-conditional, can be used together to build atomic primitives. The processor may execute the load-link instruction to read the value stored at a memory location; and the processor may subsequently execute the store-conditional instruction to the same location to store a new value if there are no intervening store operations to that location. In most implementations, the execution of the store-conditional instruction can fail to store the value for other reasons as well. The processor may include a circuit for detecting whether the execution of the store conditional instruction failed or not.

Table 5 shows the pseudo-code to implement atomic-increment using load-link and store-conditional according to an embodiment of the present disclosure.

TABLE 5

```
atomic_increment:
    load_link    $r0,A
    addi         $r0,$r0,1
    store_cond   $r0,A
    jmp_sc_fail  atomic_increment
```

As the example shown in Table 5, to execute the atomic increment instruction, the processor may execute a load instruction (load_link) to read the data stored at the memory location A, execute the increment instruction (addi) to increment the data value, and execute the store conditional instruction (store_cond) to try to write incremented data back to the memory location A based on the condition of whether the memory location has been updated. If there has been no update to the memory location A since the beginning of the execution of the atomic increment instruction, the processor can successfully store the updated data at the memory location A. If the memory location A has been modified since the beginning of the execution of the atomic increment instruction, the execution of the store-conditional instruction fails, and the code sequence attempts to re-execute the sequence by jumping to the beginning of atomic increment instruction.

Implementations of the present disclosure provide processors that implement, in hardware circuits, atomic primitives that can lock a memory location to the processor and guarantee the completion of the execution of these primitives by the processor. Thus, the execution of these primitives does not depend on a condition of whether the memory location has been accessed by another processor.

FIG. 1 illustrates a system-on-a-chip (SoC) 100 including processors 102, 130 and a memory 124 according to an embodiment of the present disclosure. Processor 102 (other processors 130 may be similarly constructed) may include logic circuitry fabricated on a semiconductor chipset such as SoC 100. Processor 100 can be a central processing unit (CPU), a graphics processing unit (GPU), or a processing core of a multi-core processor. As shown in FIG. 1, processor 102 may include an instruction execution pipeline 104 and a register file 106. Pipeline 104 may include multiple pipeline stages, where each stage includes logic circuitry fabricated to perform operations of a specific stage in a multi-stage process needed to fully execute an instruction specified in an instruction set architecture (ISA) of processor 102. In one embodiment, pipeline 104 may include an instruction fetch/decode stage 110, a data fetch stage 112, an execution stage 114, and a write back stage 116.

Processor 102 may include a register file 106 which may further include registers 108, 109 associated with processor 102. In one embodiment, register file 106 may include general purpose registers 108, 109 that each may include a certain number (referred to as the "length") of bits to store data items processed by instructions executed in pipeline 104. For example, depending on implementations, registers 108, 109 can be 64-bit, 128-bit, 256-bit, or 512-bit registers. Each of the registers 108, 109 may store one or more data items. Registers 108, 109 may be implemented to store floating-point data items and/or fixed-point data items, where the floating-point data items may represent real numbers and the fixed-point data items may represent integers.

The source code of a program may be compiled into a series of machine-executable instructions defined in an instruction set architecture (ISA) associated with processor 102. When processor 102 starts to execute the executable instructions, these machine-executable instructions may be placed on pipeline 104 to be executed sequentially. Instruction fetch/decode stage 110 may retrieve an instruction placed on pipeline 104 and identify an identifier associated with the instruction. The instruction identifier may associate the received instruction with a circuit implementation of the instruction specified in the ISA of processor 102.

The instructions specified in the ISA may be designed to process data items stored in memory 124 and/or in general purpose registers (GPRs) 108, 109. For example, the instruction may retrieve a data item from a memory region 126 to a register 108, 109. Data fetch stage 112 may retrieve data items (e.g., floating-point or fixed-point) to be processed from GPR 108. Execution stage 114 may include logic circuitry to execute instructions specified in the ISA of processor 102.

In one embodiment, the logic circuitry associated with execution stage 114 may include multiple "execution units" (or functional units), each being dedicated to perform one respective instruction. The collection of all instructions performed by these execution units may constitute the instruction set associated with processor 102. After execution of an instruction to process data items retrieved by data fetch stage 112, write back stage 116 may output and store the results in GPRs 108, 109.

In one embodiment, primitives may be constructed from instructions specified in the ISA. A primitive is a sequence of instructions that form the building block for more sophisticated program element. Thus, a program may call a primitive to invoke a sequence of instructions (vs. to invoke each instruction separately). In one embodiment, a primitive is atomic—namely, if the primitive includes a read instruction executed by the processor, it is guaranteed that no other processor can access and/or modify the data item stored at the memory location read by the read instruction until the processor has completed the execution of the primitive. An atomic primitive 118 can be constructed from one or more instructions defined in the ISA of processor 102.

In one embodiment, instructions that lock and unlock a memory region 126 may be used to build atomic primitives. The instruction that locks a memory region 126 is referred to as a lock instruction and the instruction that unlocks a locked memory region 126 is referred to as an unlock instruction. The lock instruction (or the unlock instruction) is specified as one instruction implementation in the ISA. The execution of atomic primitives 118 using the lock/unlock instructions guarantees that while the memory region is locked, no other processors can read or write to the memory region.

The lock instruction (or the unlock instruction) may include an operand to identify the memory location 126 to be locked (or unlocked). Using the lock and unlock instructions, the atomic increment primitive can be implemented using the pseudo code as shown in Table 6.

TABLE 6

| atomic_increment: | |
|---|---|
| lock | A |
| load | $r0,A |
| add | $r0,$r0,1 |
| store | $r0,A |
| unlock | A |

The processor may execute the code to achieve the following:
  execute the lock instruction (lock A) to cause locking the memory location A to processor 102. The lock of memory A is to prevent other processors from modifying memory region A,
  while the memory location A is locked to the processor 102, execute the read instruction (load) to read data from memory location A, execute the increment instruction (add), and execute the store instruction to write the incremented data back to the memory location A. Since the memory location A is locked, it is guaranteed that there are no intervening modifications to the data item stored at memory location A.
  execute the unlock instruction to unlock memory location A, thus allowing other processors to modify memory location A.

In one embodiment, the lock instruction may provide a status flag indicating whether the execution of the lock instruction is successful or not. The execution of the lock instruction may return an indicator indicating either a success status or a failure status. The status flag may allow hardware implementations of the atomic primitives to choose not completing the lock acquisition in the event that some other processors held the lock to the memory location A. In one embodiment, the status flag may be provided as a return value for executing the lock instruction. In another embodiment, the lock instruction may include a second operand identifying a register to store the status flag.

Table 7 is a pseudo code using the return status flag of the lock instruction to implement the atomic increment primitive according to an embodiment of the present disclosure.

TABLE 7

| atomic_increment: | |
|---|---|
| lock | A |
| jmp_lockfail atomic_increment //branch taken if lock acquisition is failed | |
| load | $r0,A |
| add | $r0,$r0,1 |
| store | $r0,A |
| unlock | A |

As shown in Table 7, the processor may execute the lock instruction to attempt to acquire the lock associated with the memory location A. The jmp_lockfail instruction of Table 7 may test the return status of the previous lock attempt and branches if the lock acquisition attempt fails. If the lock is successfully acquired, no other processors (or cores) can access the memory location A till the unlock instruction is executed, and the jmp_lockfail instruction will fall-through. If the lock instruction fails to acquire a lock, the memory location A is still unlocked, and the jmp_lockfail will branch back to again attempt to acquire the lock. In this example, responsive to failing to acquire the lock, the processor may again attempt to, without delay, the lock by executing the atomic increment primitive. In an alternative implementation may delay for a pre-determined time (e.g., N processor clock cycles, where N is a positive integer) before re-executing the atomic increment primitive.

In another embodiment, the execution of the lock instruction may cause the program to explicitly branch to a new memory address if the execution fails to acquire a lock. This new memory address can be encoded in the lock instruction. For example, the lock instruction may include, in addition to the first operand specifying the memory location A, a second operand specifying a second memory location B that may be locked if the attempt to lock the first memory region cannot be locked by the lock instruction.

In yet another embodiment, the execution of the lock instruction may raise an exception if the execution fails to acquire a lock. Responsive to determining that the execution fails, the processor may initiate a sequence of exception handling operations. In one embodiment, the exception handler may attempt to acquire the lock repeatedly until successfully acquiring the lock. For example, the exception handler may choose to return immediately from error-handling state and retry the lock acquisition. In another embodiment, the exception handler may desire to report the failure to acquire the. The error handling code for reporting the failure may return the error handling code to a pre-determined memory address (e.g., at a known displacement from the lock instruction address). Table 8 illustrates an exemplary code to return the error handling code to a pre-determined memory address.

TABLE 8

| atomic_increment: | | |
|---|---|---|
| lock | A | |
| load | $r0,A | |
| add | $r0,$r0,1 | |
| store | $r0,A | |
| unlock | A | |
| copy | $r1,1 | // succeeded |
| return | | |
| nop | | // dummy instruction for alignment |
| _fail: | | |
| copy $r0,0 | | // failed |
| return | | |
| ... | | |
| lock_exception_handler: | | |

TABLE 8-continued

| | | |
|---|---|---|
| add | $int_pc,$int_pc,32 | // $int_pc is interrupt pc |
| return_from_int | | // $int_pc is copied to $pc |

The lock/unlock instructions may be implemented in different manners. The memory region referenced by a memory location A for the implementation of the lock and unlock instructions can be boundary-aligned memory blocks (e.g., 8 Byte or 16 Byte blocks) such as, for example, the cache line associated with the memory region. Thus, if the alignment boundary is 16B and the address A is 0x103, the attempt to lock address A may end up locking the 16B aligned region that includes A; in this case, it will be the address range 0x100 through 0x10f (inclusive).

In one embodiment, a cache line associated with a memory region may be employed to lock a memory region 126. As shown in FIG. 1, processor 102 may be associated with cache 120 (e.g., L1-L3 caches) which is high-speed storage local to processor 102 for storing copies of data items retrieved from memory 124 to enable fast data retrieval. Cache 120 may include cache lines 122 for storing data items retrieved from memory 124.

Figure 2:
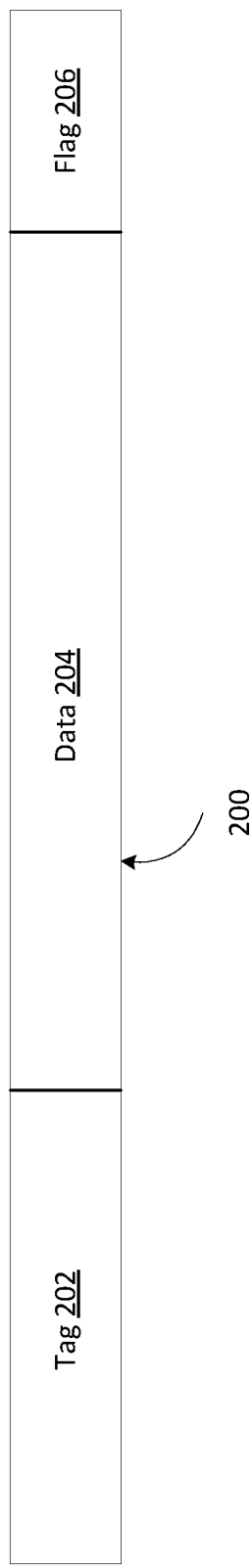
FIG. 2 illustrates an exemplary cache line of a cache.

FIG. 2 illustrates an exemplary cache line 200 including a tag field 202, a data field 204, and a flag field 206. Each cache (e.g., L1-L3 caches) may include multiple cache lines as the exemplary cache line 200. The data field 204 may store a copy of the corresponding data stored in the main memory. The tag field 202 may store the address of the main memory at which the data 204 is stored. The flag field 206 may store a state indicator of the cache line according to a certain cache coherence protocol to ensure that the access to the cache line 200 and the corresponding data in the main memory is consistent and correct.

Referring to FIG. 1, the lock instruction may lock the memory region by locking the cache line corresponding to the memory region, and the lock instruction may implemented as follows:

responsive to executing a lock instruction with respect to a memory region, the processor may:
  retrieve a data item stored at a memory location (e.g., memory region 126 or a L3 cache shared by multiple processors) into a data cache (e.g., L1 cache) that is private to processor 102 if the data item is not already present in the data cache,
  mark the cache line as locked, where the cache line can be marked as locked by setting a designated bit in the flag field of the cache line or by assigning a lock to an address associated with the cache line,
When another processor attempt to acquire the locked cache line, the processor does not abort the lock private to the processor. Instead, the processor may defer the release of the locked cache line until the locked cache line becomes unlocked, thus guaranteeing the atomic primitive that has locked the memory region, and
responsive to executing the unlock instruction with respect to the locked memory region, the processor may clear the lock indicator for the cache line in the data cache.

In one embodiment, the processor may be associated with a cache controller (not shown) to manage the cache associated with the processor. The cache may include a hierarchical structure including L1, L2, L3, cache and last-level cache (LLC). The L1 or L2 cache may be private to the processor while the L3 cache or the LLC may be shared by different processors. The cache controller may manage the different levels of cache according to a certain cache coherence protocol such as, for the example, the MESI protocol. Under the MESI protocol, a cache line can be marked as Modified (M), Exclusive (E), Shared (S), or Invalid (I) state using two or more status bits. The cache controller associated with the processor may set the two or more status bits representing the MESI states.

Under the MESI or other cache-coherence protocols, the processor may execute the atomic primitive, and during the locking process, acquire a cache line either in the shared (S) state (so that the cache line may be present in other processor caches) or in the exclusive (E) state (so that the cache line is evicted from the other caches). Because the processor may perform operations that modify the cache line, it may be preferred to acquire the cache line in the exclusive (E) state by the lock instruction. Further, it may be easier to implement the release the lock under the exclusive state. When another processor attempts to access a locked cache line, typically the release delay can be implemented by forcing the requesting processor to back-off and retry later. At the retry, the line may have been un-locked, and the usual coherence actions can be taken.

FIG. 3 is a block diagram of a method 300 to execute an atomic primitive according to an embodiment of the present disclosure. Method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of the processor 102 as shown in FIG. 1.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIG. 3, at 302, responsive to executing a read instruction to retrieve a data item from a memory location, the processing logic may cause to store a copy of the data item in a cache line of a cache.

At 304, the processing logic may execute a lock instruction to lock the cache line to the processor.

At 306, the processing logic may execute at least one instruction while the cache line is locked to the processor.

At 308, the processing logic may execute an unlock instruction to cause the cache controller to release the cache line from the processor.

In one embodiment, the processor may use a directory including entries (referred to as directory entries) to indicate that a line is locked. The directory can be a data structure object stored in an assigned memory area. Each directory entry may correspond to a line and include a lock status flag that, when set, indicates that the line is locked. In this scheme, every line can be locked. The number of outstanding locks is limited by the structure of the cache. In particular in an N-way associative cache, it is not possible to lock N+1 values, if they map to the same cache row. The cache (e.g., L2-L3 cache and LLC cache) may include cache rows that each stores a respective cache line. An N-way associative cache, at most, can store N cache lines in a cache row. When the cache controller brings a new cache line to the cache row that is already occupied by N cache lines, one of the N cache lines may need to be evicted from the cache based on a cache eviction policy. In one embodiment, a locked cache line cannot be evicted. If all cache lines in a cache row are locked, the attempt to acquire a locked cache line is the cache row is to fail.

In another embodiment, the processor may use a pool of locked addresses (e.g., physical addresses associated with a memory or virtual addresses associated with an operating system) to lock memory regions. The pool is a data structure object that is designated to store locked memory addresses. Responsive to locking an address, the processor may retrieve the data from memory and adds the address and data to that pool of locked addresses. When the processor unlocks an address, the processor may remove the address from the pool, and write the data (if modified) back to memory. If another processor attempts to acquire the memory region, the other processor may first search the pool to determine whether the requested memory region matches an address in the pool. In this case, the number of outstanding locks is limited by the size of this pool.

One issue associated with using the lock/unlock instructions is that if a processor locks a memory region but fails to unlocks it later, the failure to unlock may cause the processor's performance to degrade (or cause failures in the execution of programs). A similar degradation/failure can occur if the time interval between the execution of the lock instruction and the unlock instruction exceeds a pre-determined time interval. These situations can occur inadvertently through a programming error, or deliberately caused by a malicious attack. Consequently, the access to the lock/unlock instructions may be restricted to known sequences of code. In one embodiment, the lock/unlock instruction pair are built in atomic primitives. Thus calling the atomic primitives may ensure invoking both the lock and unlock instructions.

It is possible to have lock instructions that can fail. This failure can be indicated by a value returned by the lock instruction indicating success or failure. Alternatively, on a failure, the program may start executing code from an alternate path. In one embodiment, this alternative path can be selected in a similar manner to a branch instruction. In another embodiment, the failure to lock can be treated as an exception, and the alternative path can be the invocation of an exception handler.

In one embodiment, an operating system might provide a library of atomic primitives implemented using lock/unlock instructions, implemented and tested to satisfy the requirements that every memory region that is locked is guaranteed to be unlocked, with a small enough time delay between the execution of lock instruction and the execution of the unlock instruction. The restriction may include that the only way to use the lock/unlock instructions is to call one of the atomic primitives. Further, this restriction may be reasonably efficient, to minimize the overhead of using atomic operations.

In one embodiment, the lock/unlock instructions may be implemented as privileged instructions. The privileged instructions are instructions that can be executed by the operating system or some other privileged and trusted code. In some implementation, the privileged lock/unlock instructions can be used in conjunction with a fast privilege escalation mechanism such as the DEC Alpha CALL_PAL or the x86 SYSCALL or SYSENTER.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method of executing an atomic primitive, wherein the atomic primitive is implemented in hardware and is defined in an instruction set of architecture (ISA) of the processor, the atomic primitive comprising built-in operations comprising:

responsive to executing a read instruction to retrieve a data item from a memory location, causing to store a copy of the data item in a cache line of a cache;

executing a lock instruction to cause a cache controller to lock the cache line to the processor, wherein to lock the cache line, the cache controller is to set a lock status flag in the cache line and is to prevent other processors from modifying the data item stored at the memory location;

determining whether execution of the lock instruction is successful;

responsive to determining that the execution of the lock instruction is successful,
 guaranteeing that the memory location is locked to the processor until completion of executing an unlock instruction; and
 executing at least one instruction while the cache line is locked to the processor; and responsive to determining that the execution of the lock instruction fails,
 return a status flag indicating that the execution fails;
 branch to a pre-determined memory address; and
 trigger an exception to notify an exception handler; and executing the unlock instruction to cause the cache controller to release the lock of the cache line from the processor.

2. The method of claim 1, wherein the cache is one of an L1 data cache or an L2 data cache.

3. The method of claim 1, further comprising:
determining that the cache line is in an exclusive state under a cache coherence protocol; and
responsive to determining that the cache line is in the exclusive state, marking the cache line as locked to the processor.

4. The method of claim 1, wherein marking the cache line as locked to the processor further comprises setting a lock status flag in the cache line.

5. The method of claim 4, wherein responsive to completing execution of the at least one instruction, unsetting the lock status flag in the cache line.

6. The method of claim 1, further comprising:
responsive to identifying a request to access the cache line by a second processor, delaying granting access by the second processor to the cache line until the completing execution of the plurality of instructions.

7. A processor comprising:
a cache, the cache comprising a cache line; and
an execution circuit to execute an atomic primitive, wherein the atomic primitive is implemented in hardware and is defined in an instruction set of architecture (ISA) of the processor, the atomic primitive comprising built-in operations to:
responsive to executing a read instruction to retrieve a data item from a memory location, cause to store a copy of the data item in the cache line;
execute a lock instruction to cause a cache controller to lock the cache line to the processor, wherein to lock the cache line, the cache controller is to set a lock status flag in the cache line and is to prevent other processors from modifying the data item stored at the memory location;
determine whether execution of the lock instruction is successful;
responsive to determining that the execution of the lock instruction is successful,
guarantee that the memory location is locked to the processor until completion of executing an unlock instruction; and
execute at least one instruction while the cache line is locked to the processor; and
responsive to determining that the execution of the lock instruction fails,
return a status flag indicating that the execution fails;
branch to a pre-determined memory address; and
trigger an exception to notify an exception handler; and
execute the unlock instruction to cause the cache controller to release the lock of the cache line from the processor.

8. The processor of claim 7, wherein the cache is one of an L1 data cache or an L2 data cache.

9. The processor of claim 7, wherein the cache controller associated with the processor is to:
determine that the cache line is in an exclusive state under a cache coherence protocol; and
responsive to determining that the cache line is in the exclusive state, mark the cache line as locked to the processor.

10. The processor of claim 7, wherein the execution circuit is to mark the cache line as locked to the processor responsive to setting the lock status flag in the cache line.

11. The processor of claim 10, wherein to release the cache line from the processor, the cache controller is to unset the lock status flag in the cache line.

12. The processor of claim 7, further comprising:
identifying a request to access the cache line by a second processor; and
causing the cache controller to delay granting access by the second processor to the cache line until the execution circuit completes execution of the at least one instruction.

13. The processor of claim 7, wherein the cache controller is to access a pool to store a plurality of memory addresses that correspond to locked cache lines, and wherein to lock the cache line to the processor, the cache controller is to place a memory address associated with the cache line in the pool.

14. The processor of claim 13, wherein the cache controller is to remove the memory address from the pool to unlock the cache line.

15. The processor of claim 7, wherein the lock instruction is a privileged instruction of an operating system, and wherein the unlock instruction is a privileged instruction of the operating system.

16. The processor of claim 15, wherein the processor is to support the operating system to call the atomic primitive.

17. The processor of claim 7, wherein at least one processor other than the processor is denied access to the cache line while the cache line is locked to the processor.

18. The processor of claim 7, wherein a second processor is to access the cache line while the cache line is unlocked.

* * * * *